United States Patent [19]

Funk

[11] 3,970,524

[45] July 20, 1976

[54] TREATING WASTE MATERIALS TO PRODUCE USABLE GASES

[76] Inventor: Harald F. Funk, 68 Elm St., Murray Hill, N.J. 07974

[22] Filed: Apr. 4, 1975

[21] Appl. No.: 565,045

Related U.S. Application Data

[63] Continuation-in-part of Ser. No. 486,562, July 8, 1974, abandoned, which is a continuation-in-part of Ser. No. 252,610, May 12, 1972, abandoned.

[52] U.S. Cl. ............................ 201/2.5; 201/25; 201/29; 201/30; 201/36; 201/37; 201/38
[51] Int. Cl.² .................. C10B 31/02; C10B 51/00; C10B 21/18; C10B 57/12
[58] Field of Search ............ 201/25, 29, 30, 36–38, 201/2.5

[56] References Cited
UNITED STATES PATENTS

| | | | |
|---|---|---|---|
| 1,777,449 | 10/1930 | Rath | 201/2.5 |
| 1,781,934 | 11/1930 | Snyder | 201/2.5 |
| 1,839,277 | 1/1932 | Thomsen | 201/30 |
| 2,160,341 | 5/1939 | Reichert | 201/36 |
| 3,362,887 | 1/1968 | Rodgers | 201/21 |
| 3,525,673 | 8/1970 | Cameron | 201/25 |
| 3,562,115 | 2/1971 | Dunlop | 201/29 |
| 3,565,784 | 2/1971 | Schlinger et al. | 201/37 |
| 3,577,338 | 5/1971 | Gifford | 201/38 |
| 3,668,077 | 6/1972 | Ban | 201/29 |
| 3,702,039 | 11/1972 | Stookey | 201/25 |

OTHER PUBLICATIONS

*Cryogenic Engg* — Scott 1959 Van Nostrand, Princeton, N.J. pp. 28–31.
*Websters New World Dictionary*, World Publishing Co. N.Y. 1968, pp. 219, 264.

*Primary Examiner*—Jack Sofer
*Attorney, Agent, or Firm*—David A. Burge Co.

[57] ABSTRACT

Solid waste, including municipal, agricultural, industrial, vegetable and animal matter, garbage and waste paper, is progressively converted by means of partial oxidation and distillation into gas under controlled temperature and pressure conditions and the gas is made suitable for industrial and chemical uses by being purified and separated into its main components or ingredients.

12 Claims, 4 Drawing Figures

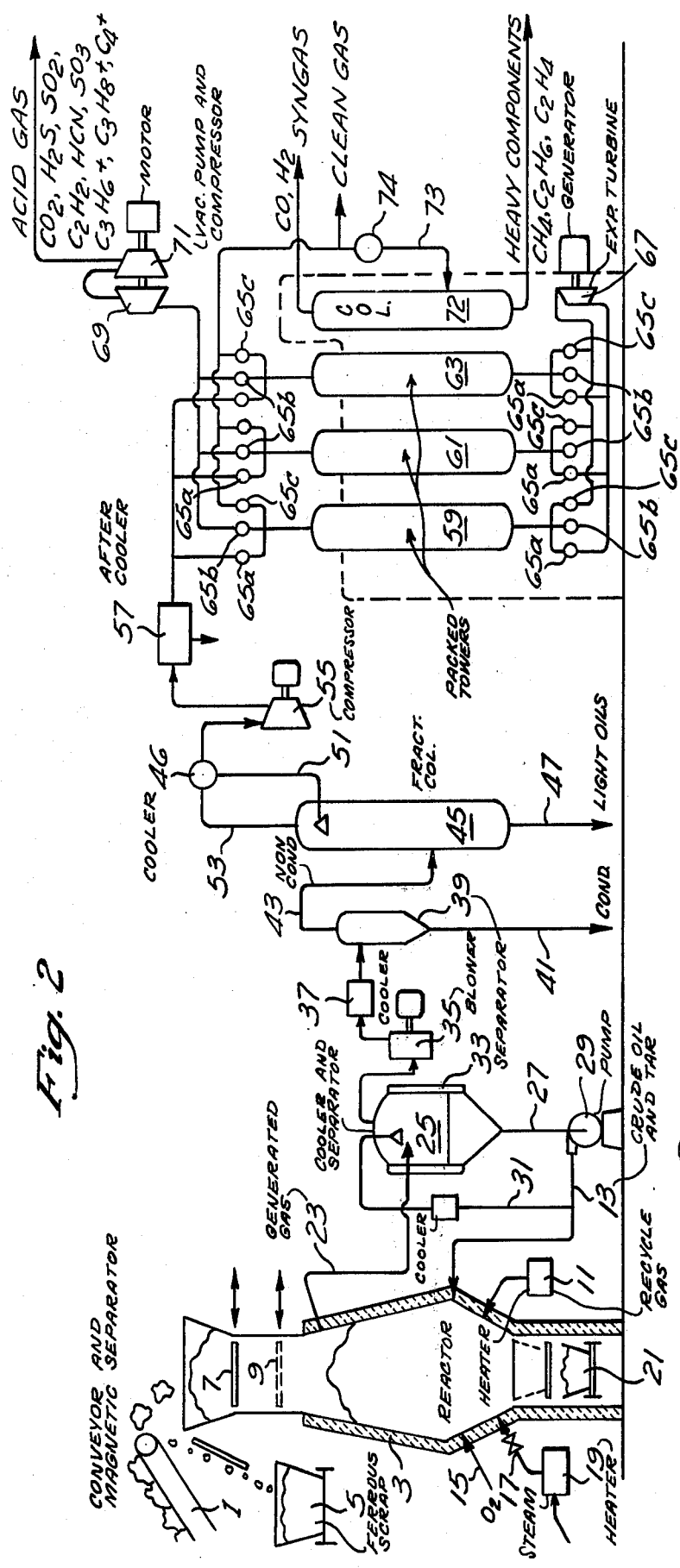
Fig. 2
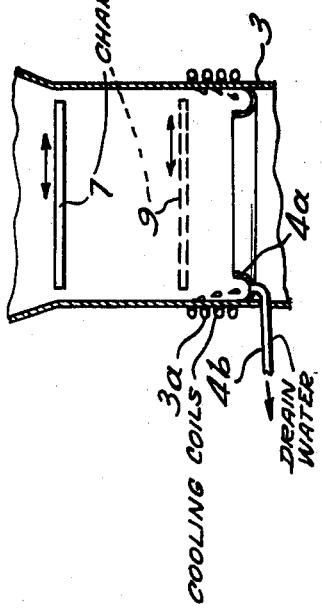
Fig. 3
Fig. 4

TREATING WASTE MATERIALS TO PRODUCE USABLE GASES

CROSS REFERENCE TO RELATED APPLICATIONS

This application is a continuation-in-part of application Ser. No. 486,562 filed July 8, 1974 (now abandoned) as a continuation-in-part of original application Ser. No. 252,610, filed May 12, 1972 (now abandoned), the disclosures of which are incorporated by reference.

BACKGROUND OF THE INVENTION

The problem of disposing of solid waste has been increasing for many years with the growth of population and is now critical in the larger cities. The usual manner of disposing of solid waste has been to use it for land fill, to dump it into water, or to incinerate it. Suitable land fills areas are becoming increasingly hard to find. Dumping solid wastes into water presents pollution problems, Incinerating solid wastes pollutes the air with harmful gases and increases its $CO_2$ content. When rains remove excess $CO_2$ content from the air, the acidity of rain water is increased and this may have harmful effects on plants, animal life and buildings. Incinerators require tall stacks and scrubbers to remove harmful components from the gas and these structures are quite expensive.

Numerous efforts have been made to solve solid waste problems but none have been entirely satisfactory. One proposal subjects solid wastes to dry distillation or pyrolysis at temperatures between about 900°C. and about 1200°C. without the injection of steam or oxygen and thereby produces crude oil. Scrubbing the gas products of this process is required and the scrubbing treatment causes pollution of water and atmosphere.

Another proposal includes the steps of applying heat externally to a retort in which garbage is heated without internal combustion. The garbage is distilled or pyrolized at a temperature of about 400°C. The resulting gas is cracked, enriched, and scrubbed to make it suitable for heating and illuminating purposes. The scrubbing of the gas creates pollution problems.

Another proposal calls for garbage to be destructively distilled while on a traveling grate in an open system. Organic material is thermally decomposed at temperatures between about 1000°F. and about 2000°F. in the absence of oxygen. Some 34–36% of the starting material remains at the completion of the process. Most of the gas produced during the process is consumed in the process and the gas which is not so consumed is heavily diluted with carbon dioxide and nitrogen and is not suitable for uses in the chemical industry.

In other proposals complete combustion processes are used but without the recovery of any useful ingredients from the resulting gas. As a result of these processes the atmosphere is polluted by the gas, and the $CO_2$ content of the atmosphere is increased.

Still other proposals have as their objective the removal and upgrading of oil in oil shale. Such proposals produce hydrogen by using steam by partially burning oil in the presence of a catalyst.

SUMMARY OF THE INVENTION

The present invention overcomes the foregoing and other drawbacks of the prior art and provides novel and improved processes for treating solid waste materials to provide gases usable in industry.

The process is carried out continuously in a closed system in which a maximum amount of the solid waste is converted into gas by partial oxidation in a combustion zone with a minimum amount of oxygen and substantially no melting of the inert material. The resulting products of combustion are converted into various components or fractions useful in industry.

Fuel is burned in the presence of oxygen without the need for a catalyst in a lower part or combustion zone of a reactor or retort. Heat produced in the combustion process raises the temperature in the retort to above about 600°C. Gaseous combustion products rise through and intimately contact solid waste supported in a reduction zone above the combustion zone where some of the carbon dioxide is reduced to carbon monoxide. These gases pass into a carbonization zone above the reduction zone, where they volatilize and distill such fluids as moisture, tars and oils in and on the solid waste. Gases which rise from the carbonization zone are cooled by the incoming charge and are withdrawn from the retort. The unburned part of the solid waste is discharged from the combustion zone at the bottom of the retort. All but about 2% to 5% by volume of the solid waste is consumed in the process. The solid waste which remains for disposal is largely inert material, some of which is recoverable as char.

Gases issuing from the retort are purified in stages by condensing and removing contaminants and undesired components. Tars and oils may be condensed in steps of progressively lowered temperatures. The resulting gas is further purified by being cooled to below about −100°C. and separated into its condensable and non-condensable components. The condensable component may be "frozen out," i.e., converted into the liquid, solid, or sublimed phases. Such components are commonly referred to in the industry as a "subgas," a sublimable gas or a sublimation gas. The non-condensable components comprise a clean gas suitable for use in industry for fuel and in metallurgical processes and as starting materials for chemical products including plastics, dye stuffs and pharmaceuticals.

The process of the present invention is quite economical. A given weight of fuel is adequate to treat several times its weight of solid waste and the recovered gases have high sales value.

THE PROCESS GENERALLY

A solid waste which may be utilized in the process of the present invention is municipal waste, as noted in *Chemical Engineering* June 21, 1971. Municipal waste has about the composition shown in Table I.

TABLE I

| Components | Wt. % |
|---|---|
| Paper Products | 43.8 |
| Metals | 9.1 |
| Food waste | 18.2 |
| Glass & ceramics | 9.0 |
| Garden waste | 7.9 |
| Plastics, rubber & leather | 3.0 |
| Textiles | 2.7 |
| Wood | 2.5 |

TABLE I-continued

| Components | Wt. % |
|---|---|
| Rock, slag, etc. | 3.8 |

The composition of gas produced in the process of the present invention is dependent on several factors including (1) the nature and amount of the materials which are brought into the retort in addition to the solid waste, (2) the temperature and amounts of fluids introduced into the retort, and (3) the temperature in the combustion zone in the retort.

The principal materials which are brought into the retort in addition to the solid waste are fuel and oxygen. Oxygen enriched air may be used but is not preferred unless a gas with a high content of nitrogen is desired. Steam may be brought into the retort to provide a source of hydrogen when the solid waste material contains less than about 20% of moisture. In case steam is used it should be preheated but its use is not preferred because heat is required for its decomposition.

Preferably fuels to be burned in the retort are preheated to approximately the temperature existing in the lower part of the retort before they are introduced into the retort. Tars, oils and recycled gas produced by the process may be used as fuel. Waste lubricating oil, crankcase oil and the like may also be used as fuel. Coal may also be used as a fuel and may be introduced into the top of the retort, preferably along with the solid waste. Low grade, high sulfur-containing coal may be used with this process for the sulfur content is converted into gases which can be recovered.

It is desirable to use industrial waste as fuel because of its high heating value and its relatively high hydrogen to carbon ratio. Prior incinerator processes are not adapted to use of industrial waste.

The highest temperature existing in the retort is in the combustion zone, i.e., in the lower part of the retort. As the waste in that zone is burned, the resulting gases are heated and move upwardly in that zone through and in intimate contact with the solid waste. The waste is directly heated by these gases. The gases are cooled as they give up heat to the solid waste and when they issue from the upper part of the retort they may be 200°C. or 300°C. lower in temperature than the temperature in the combustion zone. For example, where the temperature in the combustion zone is about 800°C., the temperature of the gases discharging from the retort will be about 600°C. or less.

When solid waste is treated in the retort by burning fuel in the presence of oxygen and the temperature in the combustion zone is about 800°C., a typical composition of the gases leaving the retort will have a general composition which may be about as shown in Table II.

TABLE II

| | Vol. |
|---|---|
| Hydrogen | 39.0% |
| Carbon monoxide | 16.2% |
| Methane | 15.5% |
| Ethane | 2.2% |
| Carbon dioxide | 15.5% |
| Ethylene | 7.9% |
| Propane | 0.6% |
| Propylene | 2.5% |
| Butane + | 0.6% |

Such a gas may be produced by injecting into the retort fluid fuel amounting to about 20% of the weight of the solid waste and oxygen amounting to about 15% by weight of the total charge of the fluid fuel being preheated to about 800°C.

Gas of the general composition shown in Table III may be produced by maintaining a temperature in the combustion zone of about 1000°C. which is accomplished by using more oxygen and heating the fuel to a higher temperature than that used in producing the Table II gas.

TABLE III

| | Vol. |
|---|---|
| Hydrogen | 45.5% |
| Carbon monoxide | 17.1% |
| Methane | 11.0% |
| Ethane | 0.9% |
| Carbon dioxide | 19.5% |
| Ethylene | 4.4% |
| Propane | 0.2% |
| Propylene | 1.0% |
| Butane + | 0.4% |

Gas produced at the lower temperature, as in Table II, contains more olefins than gases produced at the higher temperature. Gases containing the higher amounts of olefins are useful especially in producing plastics.

Since the hydrocarbon content of the gas produced by this invention depends largely on the temperature in the combustion zone, it is desirable to operate at such a temperature in that zone as will produce a gas of the desired composition. For example, the temperature in the combustion zone may be in the range of about 600°C. to about 700°C. when gas of the higher olefin to hydrocarbon composition is desired.

When the approximate composition of the gas to be produced is determined, the amounts of fuel, oxygen, and steam if used, which are required to produce the desired composition of gas and to maintain the predetermined temperature for such production, are introduced into the retort and such introduction is continuous while the addition of charges of solid waste to the retort are batchwise.

One important aim is to maintain the amount of $CO_2$ produced as low as possible because that gas is inert and the equipment required to separate it increases with the amount of $CO_2$.

In general the desired temperature for the production of the gas of predetermined composition may be maintained by varying the amounts of fuel, such as oil or recycled gas, oxygen, and steam if used, which are introduced into the retort. In general the temperature will increase with the amounts of oxygen and the recycled gas which are introduced into the retort. Steam as well as carbon dioxide will exert a lowering effect on the temperature. Also the higher the temperature of the preheated materials which are introduced into the retort, the higher will be the temperature in the retort. Retort temperature will also vary with the amount and nature of the fuel used.

A general object of the present invention is to provide novel and improved processes for generating gases usable in industry from solid waste materials.

These and other objects and a fuller understanding of the invention may be had by referring to the following description and claims taken in conjunction with the accompanying drawing.

BRIEF DESCRIPTION OF THE DRAWINGS

FIG. 2 is a schematic drawing of apparatus for carrying out the present process; and FIGS. 3 and 4 are schematic views of modifications of the apparatus of FIG. 2.

Figure 1:
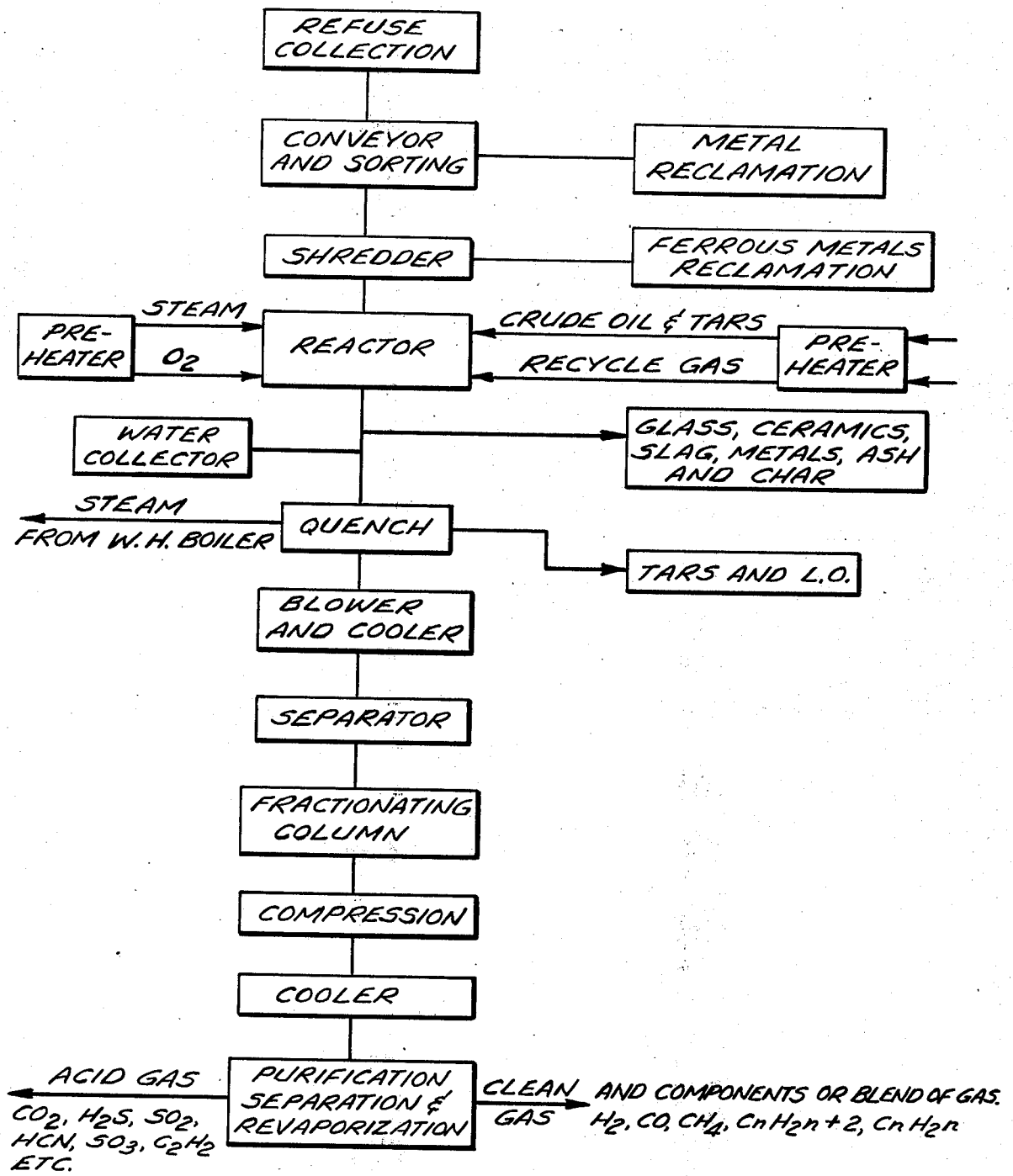
FIG. 1 is a flow diagram showing steps of the present process.

The preferred process of the present invention will now be described. Its steps are set out in FIG. 1 and can be followed in conjunction with the following description.

Solid waste which is to be treated by the present process may contain various solids such as ferrous and non-ferrous articles of varying size, and glass articles in the form of bottles and the like. These articles are removed as a first step of the process. Glass and non-ferrous articles may be removed manually. Ferrous articles may be removed manually or by means of magnets. The removed articles may be sorted and reclaimed or discarded.

Referring to FIG. 2, after such solids as ferrous and non-ferrous and glass articles are removed, the solid waste is shredded and placed on a conveyor 1. The conveyor transports the waste to a position atop a retort 3. Non-magnetic material discharges from the conveyor 1 into the top of the retort. Magnets (not shown) disposed within the conveyor serve to retain magnetic materials, such as shredded iron food cans, on the conveyor until after the other material has been discharged from the conveyor. Magnetic materials drop from the conveyor 1 into a scrap collector 5.

The retort 3 is provided with upper and lower doors 7, 9 which permit solid waste to be introduced thereinto while preventing egress or escape of gas from within the retort. When a charge of solid waste is to be introduced into the retort, the upper door 7 is opened while the lower door 9 remains closed. When the charge on door 9 substantially fills the space between the two doors, the upper door 7 is closed and the lower door 9 is opened permitting the charge of solid waste to drop into the retort. Since pressure existing in the retort is quite low, i.e., not exceeding about 10 inches of water regardless of the temperature, the doors 7, 9 are adequate to prevent the escape of undesirable quantities of gas during charging of the retort.

After the retort has been charged, as described, oxygen and fuel are introduced into the lower part of the retort and the fuel is ignited with the production of flame. This burning of fuel takes place in what may be termed a "combustion zone" in the lower part of the retort. The burning fuel heats the solid waste. As the products of combustion rise in the retort, they intimately contact and heat the solid waste with resultant vaporization and distillation of parts of the charge. Gases are withdrawn from the upper part of the retort. Gases which have been withdrawn from the retort and treated, as will presently be described, may be used as fuel in the retort. To that end recycled gas may be introduced into the retort as indicated at 11, and crude oil and tar may be introduced through the line indicated at 13. Oxygen, and oxygen enriched air, when employed, may be introduced at 15. When steam is used, it may be introduced as indicated at 17 preferably after being heated as indicated at 19.

Although the charging of the solid waste into the retort is batchwise, the withdrawal of the produced gas is continuous. That gas is withdrawn from the retort through line 23 and is passed into a quench chamber 25 wherein it is cooled to about 300°C., as by being sprayed with previously condensed oils and/or tars, with resultant condensation of some of the tars and oils. The condensate is withdrawn from the chamber 25 through line 27 and delivered into the upper part of the chamber 25 by pump 29 through line 31 which includes a cooler. If desired, a water coil or wall 33 may be positioned adjacent to the vertical walls of chamber 25 in position for the water flowing therein to be heated by the heated gases within the chamber.

Gas which is not condensed at the temperature of about 300°C. in chamber 25 is withdrawn, as by blower 35 and passed through a heat exchanger 37 and into separator 39. Some of the tars and light oils in the gas entering separator 39 are condensed, as the temperature is lowered therein to about 100°C., and may be withdrawn through line 41 and used for any suitable purpose, or may be recycled to the reactor.

The gas which is not condensed in separator 39 is withdrawn through line 43 and passes into a fractionating column 45. The remainder of the light oils condense in this column and may be withdrawn therefrom through line 47 and used for any suitable purpose. Part of the overhead gas from column 45 is condensed in cooler 46 and may be returned through line 51 to fractionating column 45 for use as reflux. The uncondensed gas is drawn from cooler 46 through line 53 by gas compressor 55.

Preferably the gas is compressed by compressor 55 to a pressure of about 50 pounds per square inch and is reduced to an ambient temperature of about 20°C. by passing through cooler 57.

The gas from cooler 57 is then separated into condensable, and non-condensable components and purified. The separation, and purification, of the non-condensable gas and the subgas may be carried out by means of similar towers 59, 61 and 63, automatic valves 65a, 65b and 65c, expansion turbine 67, vacuum pump 69, compressor 71 and fractioning column 72. Each of the towers 59, 61 and 63 is similar to the regenerator disclosed on pages 29–31 of *Cryogenic Engineering* by Russel B. Scott, published in 1959 by D. Van Norstrand Co., Princeton, N. J. Each of the towers 59, 61 and 63 contains loose solids, for example, ceramic balls, quartzite pebbles, steel shot and other solids having large surface areas and capable of acting as heat capacitants and being resistant to corrosion.

The manner of treating the gas by use of that apparatus may be visualized as that of subjecting the gas to several like cycles, repeated time after time as long as the gas is being produced. Each cycle consists of the simultaneous steps of separating and removing the non-condensable or clean gas from the condensable subgas by converting the latter into its solid phase and then revaporizing the subgas component of a prior cycle. These steps may also be considered as loading, separating and revaporizing phases.

The first step of the cycle is carried out by opening the valves 65a at each end of tower 59 and valves 65c at each end of tower 63 and actuating turbine 67. Gas will flow through tower 59, turbine 67, and tower 63. The gas is allowed to flow through that course for a short period of time, for example, for about 6 to 8 minutes.

Since the gas cools in tower 59, due to contact with the large surface area of the cooler solids in the tower, and the turbine 67 expands the gas and delivers it at a pressure of about 5 psig into tower 63, certain components of the gas are condensed or converted into the solid phase in tower 59 while the non-condensed or clean components of the gas pass out of tower 59 and thence through tower 63. This gas is purified by being freed from the subgas and is separated in column 72 into synthesis gas containing CO and $H_2$ and heavier components containing $CH_4$, $C_2H_6$ and $C_2H_4$. If column 72 is omitted, the line 73 leading thereinto is closed by valve 74. Those two gases will issue as a mixture and may be known as clean and acid gas.

The second step, i.e., that of revaporizing the solid phase subgas from a prior cycle is carried out by closing the valves 65a, 65b and 65c at the lower end of the tower 61 and connecting the other end of that tower through valve 65b to pump 69 and compressor 71. The effect of the resulting vacuum in tower 61 is to vaporize the solid phase subgas therein and to draw the resulting gas out of that tower. After the withdrawn gas is compressed, it is discharged to storage or to apparatus for producing useful compounds therefrom. This gas is called acid gas and consists mainly of $CO_2$ with small amounts of $H_2S$ and $SO_2$, $C_3H_6$ and $C_3H_8$ and $C_4$ hydrocarbons and traces of $SO_3$ and HCN. Depending on the temperature in the lower end of the regenerators, part of the $C_2$ fraction may also be retained. Noxious gases, containing chlorine, sulfur and the like may be neutralized and discarded thereby avoiding pollution.

The next cycle is like the one just described and consists of the first step of passing the gas from cooler 57 through valve 65a into tower 63, separating components of the gas in that tower and passing non-condensed components through tower 61, and the second step is that of simultaneously revaporizing the condensed components remaining in tower 59 from the prior cycle.

The third cycle is like the two foregoing cycles. The first step of that cycle is to pass gas into tower 61 and its non-condensed components through tower 59 and the second step is to revaporize components remaining in tower 63 from the prior cycle by withdrawing them through pump 69 and compressor 71.

A modification of the apparatus of FIG. 2 is shown in FIG. 3. There a cooling coil 3a surrounds the upper end of the retort and serves, when cooling fluid is flowing through the coil, to condense moisture in the gases within the part of the retort defined by the coil. This water may flow down the retort wall and into the annular trough-like collector 4a. A drain line 4b communicates with the collector 4a and leads through the wall of the retort 3 for draining water from the collector 4a.

It will be understood that the apparatus just described will be useful when the temperatures in the retort have been controlled so that the gases are not far above the boiling temperature of water. When the temperature is such in the upper part of the retort that the moisture will be condensed in this manner, tar and oil vapors will also be condensed and thus the amount of tars and oils carried along with the outgoing gases may be reduced or completely eliminated. When these vapors are condensed at the time the moisture is condensed, they are carried down with the descending solid waste and are revaporized and cracked when they reach a temperature zone which is sufficient for that purpose.

FIG. 4 shows a modification of the apparatus of FIG. 2 which may be made when moisture is condensed by the cooling coil 3a. In that event the parts 13, 25, 27, 29, 31 and 33 may not be needed and may be omitted with the line 23 being connected directly to the blower 35. In case oils also are retained in the retort, line 23 may be connected directly to compressor 55 with the intervening parts being omitted.

It is to be understood that although the process described hereinabove may be carried out at the stated retort pressure of 10 inches of water, which is equivalent to 0.36 (psig), it is possible, and may be preferable in some instances, to operate at a higher pressure in the retort. For example, when the modifications shown in FIGS. 3 and 4 are present in the apparatus and a pressure of about 7 to about 10 (psig) exists in the retort, the blower 35 may be omitted as well as the other just mentioned parts. Furthermore, when the pressure in the retort approximates 50 (psig) the compressor 55 may be omitted whether or not the modifications of FIGS. 3 and 4 are used.

It will be understood that the herein described process may be practiced on various quantities of solid waste material produced by communities varying from less than 100,000 population to several million or more depending on the products desired and the equipment required. By this process ammonia or methanol synthesis gas can be produced. The minimum economical size for such an ammonia plant is on the order of about 600 tons of ammonia per day for which about 5,000 tons per day of solid waste material would be required and that amount would be expected from a population of at least about 2,000,000 people.

Similarly, the approximately 250 tons of solid waste material produced daily by 100,000 people could be converted by this process into methane with comparatively simple and inexpensive additional equipment. The methane could be used to supplement the supply of fuel, or stored after being liquefied, and used for as a supplement to a natural gas supply under sudden increased demands for fuel.

The off gases of refineries and chemical process industries can be charged into the retort. Contaminants can be recovered from gases discharging from the retort and neutralized and can then be discarded without polluting air or water.

The present process has other advantages over the incinerator process of disposing of solid waste where all effluent gases must be scrubbed to remove harmful pollutants. Ordinarily up to a ton of water is required to scrub the gas from a ton of burned solid waste and large expensive scrubbers are used. The subgas produced by the present process amounts to only 2% to 3% of the stack gas of the incinerator process and the cost of the unit for neutralizing the harmful components of the subgas and the operating costs thereof are proportionately low.

For the sake of certainty and brevity, the term "solid waste", as used in this patent means and includes one or more of the above identified solid waste materials, namely, municipal waste as shown in Table I hereof, agricultural waste including manures and the like, industrial waste including plastic articles, rubber articles and contaminated petroleum fractions, waste vegetable matter, animal matter including hides, bones and the like, garbage and waste paper.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed. It is intended that the patent shall cover, by suitable expression in the appended claims, whatever features of patentable novelty exist in the invention disclosed.

What is claimed is:

1. The process of converting solid waste into useful fluids while preventing substantial air and water pollution which comprises the steps of:
   a. maintaining a retort, constituting part of a closed system, partly filled with shredded solid waste by charging such waste into the retort through an opening in the upper part thereof while preventing escape of gases through said opening,
   b. partially oxidizing and combusting said shredded solid waste in a combustion zone in the lower part of the retort and adjusting the heating value and composition of the resulting gases by controlling the temperature in said zone and by varying the volume and temperature of fuel and oxygen brought into said zone,
   c. volatilizing and distilling moisture and fluids on and in the shredded solid waste by conducting said gases from said zone up through and in intimate contact with said shredded solid waste thereabove,
   d. withdrawing from the upper part of the retort mixed gases including the gases resulting from the said oxidizing and combusting of said shredded solid waste and the volatilized and distilled moisture and fluids of the shredded waste,
   e. compressing gases withdrawn from said retort to about 50 psig and cooling them to an ambient temperature of about 20°C.,
   f. passing the thus compressed and cooled gases through a chamber in intimate contact with heat absorbing means and separating them into their condensable and non-condensable components, and
   g. separating and removing the non-condensable component and revaporizing the condensed component.

2. The process set forth in claim 1 in which the gas which is withdrawn from the upper part of the retort is cooled to about 300°C. and tars and oils are removed therefrom prior to the compressing of gases to about 50 psig and cooling to about 20° C.

3. The process of claim 1 wherein the step of oxidizing and combusting shredded solid waste in a combustion zone includes the step of maintaining the combustion zone temperature within the range of about 600°C. to about 1000°C.

4. The process of claim 1 wherein the fuel brought into the combustion zone of the reactor includes a portion of the gases withdrawn from the upper part of the retort.

5. The process of claim 1 additionally including the step of injecting steam into the retort.

6. The process of claim 1 wherein a pressure of about 7 to 10 psig is maintained in the retort.

7. The process of claim 1 wherein the compression of gases to about 50 psig is effected by pressurizing the retort.

8. The process of claim 1 wherein the non-condensable component is separated into a synthesis gas component and a heavier component.

9. The process of claim 1 wherein a packed tower defines the chamber through which compressed and cooled gases are passed for separation into condensable and non-condensable components, and the step of revaporizing condensed components is conducted by communicating the chamber with a pump to partially evacuate the chamber.

10. The process of claim 9 additionally including the steps of compressing and neutralizing noxious gases which have been revaporized and removed from the chamber.

11. The process of claim 1 wherein a pressure of about 0.36 psig is maintained in the retort, gases withdrawn from the upper part of the retort are compressed, and tars and light oils are removed from the gases prior to the step of compressing gases to about 50 psig.

12. The process of claim 11 wherein the fuel brought into the combustion zone of the reactor includes a portion of the tars and light oils removed from gases.

* * * * *